(12) United States Patent
Tsukada et al.

(10) Patent No.: US 6,295,883 B1
(45) Date of Patent: Oct. 2, 2001

(54) OPENING AND CLOSING TYPE INTERIOR DEVICE

(75) Inventors: Masashi Tsukada, Aichi-ken; Kenichi Oji, Nisshin, both of (JP)

(73) Assignee: Kejima Press Industry Co., Ltd., Toyota (JP)

( * ) Notice: Subject to any disclaimer, the term of this patent is extended or adjusted under 35 U.S.C. 154(b) by 0 days.

(21) Appl. No.: 09/417,780

(22) Filed: Oct. 14, 1999

(30) Foreign Application Priority Data

Oct. 19, 1998 (JP) .................................................. 10-296271

(51) Int. Cl.$^7$ .......................... F16H 19/08; F16D 63/00; B60R 7/06
(52) U.S. Cl. .......................... 74/89.18; 74/409; 74/411.5; 188/83; 188/290; 296/37.12; 361/681; 361/682
(58) Field of Search ................................. 74/89.18, 89.19, 74/409, 411.5; 188/83, 290; 296/37.12; 361/681, 682

(56) References Cited

U.S. PATENT DOCUMENTS

| | | | |
|---|---|---|---|
| 4,688,695 | * | 8/1987 | Hirohata ................................. 49/364 |
| 4,766,619 | * | 8/1988 | Takeda ................................... 4/246.1 |
| 4,852,032 | * | 7/1989 | Matsuda et al. ...................... 361/680 |
| 5,065,884 | * | 11/1991 | Naritomi et al. ..................... 220/264 |
| 5,605,208 | * | 2/1997 | Friedrichsen et al. ............... 188/130 |
| 5,625,533 | * | 4/1997 | Kim et al. ............................ 361/681 |
| 5,893,478 | * | 4/1999 | Maruoka ............................... 220/264 |
| 6,067,667 | * | 5/2000 | Suzuki ................................... 4/246.1 |

FOREIGN PATENT DOCUMENTS

| | | |
|---|---|---|
| 57-102179 | 6/1982 | (JP) . |
| 8-9291 | 1/1996 | (JP) . |

* cited by examiner

Primary Examiner—Allan D. Herrmann
(74) Attorney, Agent, or Firm—Pillsbury Winthrop LLP

(57) ABSTRACT

An opening and closing type interior device includes a fixed member, a movable member which is capable of being opened and closed and is movable relative to the fixed member, an actuator including a driving source and a gear mechanism, and a damper coupled to one of the movable member and the fixed member. The opening and closing type interior device includes, for example, a display device for an automobile.

10 Claims, 6 Drawing Sheets

OPENING AND CLOSING TYPE INTERIOR DEVICE

BACKGROUND OF THE INVENTION

1. Field of the Invention

The present invention relates to an opening and closing type interior device which is disposed, for example, in an automobile, and more particularly relates to an opening and closing type interior device which can suppress generation of noise.

2. Description of Related Art

A typical conventional opening and closing interior device includes a display device for an automobile. The display device includes a fixed member, a movable member rotated about a rotational axis relative to the fixed member so as to be opened and closed, and an actuator for driving the movable member to rotate so as to be opened and closed. The actuator includes a driving source, and at least one gear (generally, a plurality of gears) disposed in a driving force transmission path.

A backlash is provided in each engaging portion of gears. The backlash absorbs dimensional deviations between the gears, thermal expansion in the gears and the like, thereby securing an appropriate engagement between the gears.

However, there is the following problem with the conventional device.

When the movable member is opened and closed, a center of gravity of a movable assembly, which includes the movable member and a member or members rotatable together with the movable member, crosses above the rotational axis of the movable member and produces a moment. The moment caused about the rotational axis is due to the weight of the movable assembly and changes as the center of gravity of the movable assembly crosses above the rotational axis, so that the load imposed on the actuator for opening and closing the movable member reverses between a positive load and a negative load. As a result, the engagement of a driving side gear of the actuator with a driven side gear of the actuator is reversed, causing hammering in the gears due to the backlash of the gears thereby generating noise.

SUMMARY OF THE INVENTION

An object of the present invention is to provide an opening and closing type interior device which can suppress noise generated due to backlash in gears.

The above object can be achieved by the present invention, as follows.

An opening and closing type interior device includes a fixed member, a movable member capable of being opened and closed and being movable relative to the fixed member, an actuator for driving the movable member to be opened and closed, and a damper coupled to one of the movable member and the fixed member. The actuator includes a driving source for driving the movable member and at least one gear mechanism disposed in a path transmitting a driving force from the driving source to the movable member.

The movable member includes a rotational axis, and is rotatable about the rotational axis relative to the fixed member between a fully-opened and fully-closed position. The movable member, in cooperation with a member or members rotatable together with the movable member, constitutes a movable assembly having a center of gravity. The center of gravity of the movable assembly is located on one side of a vertical line passing through the rotational axis when the movable member is located at the fully-opened position, and is located on the other side of the vertical line passing through the rotational axis when the movable member is located at the fully-closed position, and the center of gravity crosses the vertical fine passing through the rotational axis when the movable member is opened and closed.

In the above-described opening and closing type interior device, when the movable assembly, including the movable member and members rotatable together with the movable member, is opened and closed, the damper applies a load to the movable assembly in a direction suppressing the opening and closing motion thereby preventing the load imposed on the actuator from being reversed between positive and negative when the center of gravity of the movable assembly crosses the vertical line passing through the rotational axis of the movable member. As a result, the engagement of the driving side gear with the driven side gear of the actuator is prevented from being reversed, so that the noise generated due to the backlash of the gears is suppressed.

BRIEF DESCRIPTION OF THE DRAWINGS

The objects, features, and advantages of the present invention will become more apparent and will more readily be appreciated by the following detailed description of the preferred embodiments illustrated by the accompanying drawings, in which.

DETAILED DESCRIPTION OF THE PREFERRED EMBODIMENTS

FIGS. 1–12 illustrate an opening and closing interior type device according to an embodiment of the present invention. The opening and closing type interior device includes, for example, an opening and closing type interior device for an automobile. The opening and closing type interior device for an automobile includes, for example, a display device for an automobile. However, the device is not limited to the display device and may include a container for an automobile, an ash tray for an automobile and the like. In the drawings, the display device for an automobile is typically illustrated as an example, but the present invention is not necessarily limited thereto.

As shown in FIGS. 1–5 and 7, an opening and closing type interior device 10 includes, a fixed member 11, a movable member 12 which is movable relative to the fixed member 11 and is capable of being opened and closed, an actuator 15 for driving the movable member to be opened and closed, and a damper 16 disposed in either the movable member 12 or the fixed member 11. The actuator 15 includes a driving source 13 for driving the movable member 12 and at least one gear mechanism 14 disposed in a path for transmitting a driving force from the driving power source 13 to the movable member 12.

In a case where the device 10 is the display device for an automobile, the movable member 12 includes a casing 1, a display 2 and a door 3, which are connected integrally to each other. The movable member 12 includes a rotational axis 4, and rotates about the rotational axis 4 relative to the fixed member 11 to a fully-opened position or a fully-closed position. The actuator (for example, a geared motor) 15 and portions rotating about the rotational axis 4 including at least one gear mechanism 14 are fixed to or supported by the movable member 12, and are rotated about the rotational axis 4 together with the movable member 12 between an opened and closed position. The geared motor 15 includes a gear 14a constituting a part of the gear mechanism 14. A gear 14b is fixed to an output shaft of the actuator 15 protruding from the casing 1 and constitutes a part of the gear mechanism 14. The movable member 12, the actuator 15 and the portions rotatable about the rotational axis 4 including the gear mechanism 14 constitute a movable assembly 5. The movable assemble 5 has a center of gravity 9 located at a position spaced away from the rotational axis 4.

Figure 6:
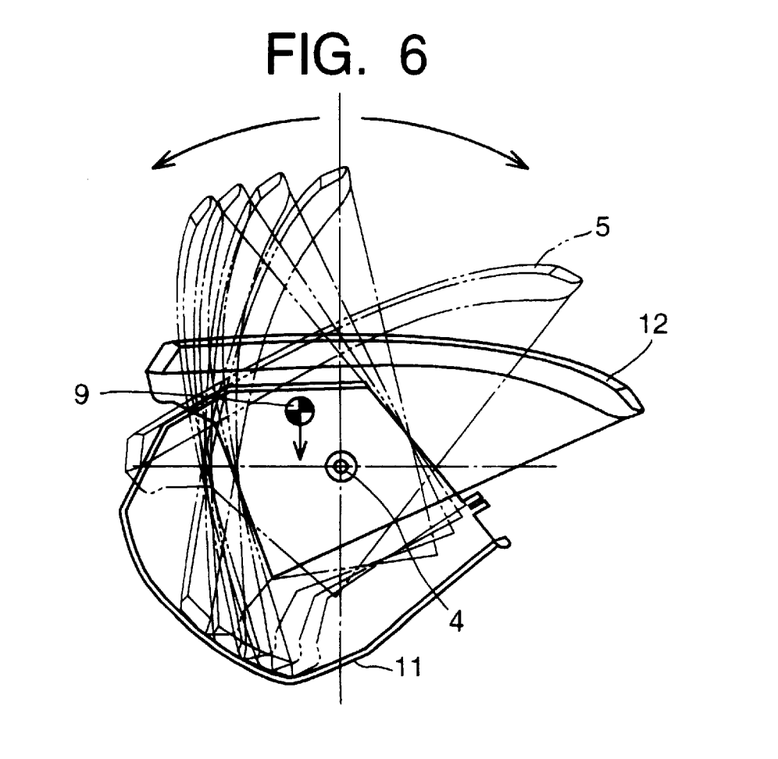
FIG. 6 is a side elevational view illustrating a positional relationship between a center of gravity of a movable assembly and a rotational axis of a movable member, which is applicable to both the present invention and a conventional device.

More particularly, the center of gravity 9 of the movable assembly 5 is located on one side of a vertical line passing through the rotational axis 4 when the movable member 12 is fully-opened, and the center of gravity 9 is located on the other side of the vertical line passing through the rotational axis 4 when the movable member 12 is fully-closed. A locus of the center of gravity 9 of the movable assembly 5, at the time of opening and closing of the movable member 12, intersects the vertical line passing through the rotational axis 4 of the movable member 12. The center of gravity 9 of the movable assembly 5 crosses the vertical line passing through the rotational axis 4 of the movable member 12 when the movable member 12 is opened and closed. In FIG. 6, the center of gravity 9 passes just above the rotational axis 4 of die movable member 12, but the center of gravity 9 may pass just below the rotational axis 4 of the movable member 12.

In the case where the device 10 is the display device for an automobile, the fixed member 11 includes right and left side members (rails) 6 and 7, and a retainer 8 connected to the side members 6 and 7. Bearings are disposed in the side members 6 and 7, and a shaft is disposed in the casing 1. The casing 1 is supported by the bearings of the side members 6 and 7 so as to be rotatable about the rotational axis 4. An arcuate gear 14c of an internal gear extending in an arc is fixed to the side members 6. The gear 14c engages a gear 14b fixed to the output shaft of the actuator 15.

In the foregoing description, although the actuator 15 is fixed to the movable member 12 and the arcuate gear 14c of the internal gear is fixed to the fixed member 11, the actuator 15 may be fixed to the fixed member 11 and the arcuate gear 14c may be fixed to the movable member 12.

Figure 1:
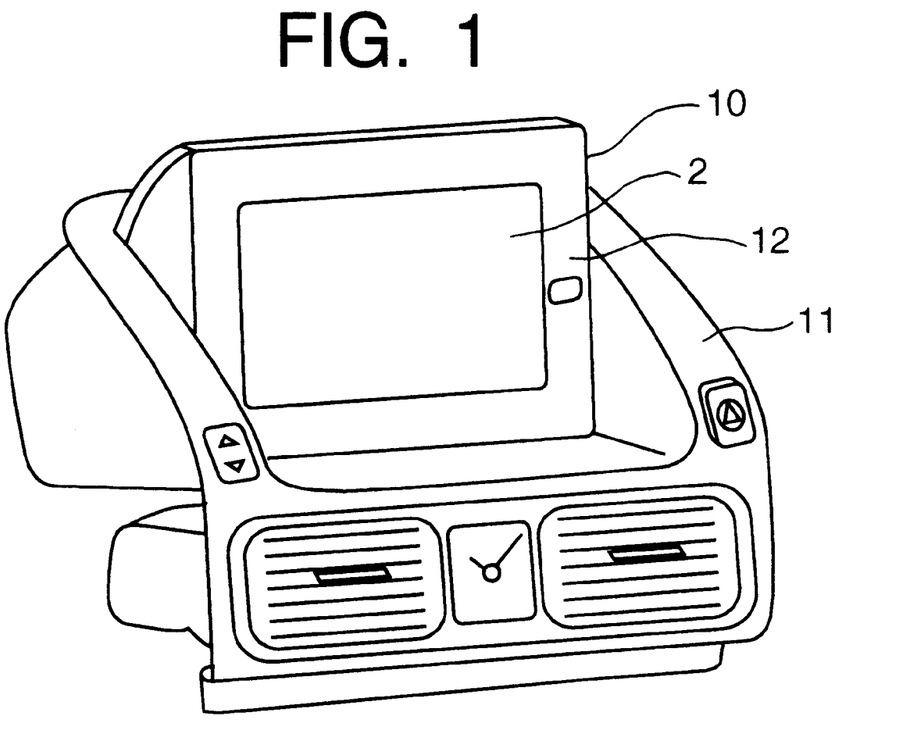
FIG. 1 is a perspective view of an opening and closing type interior device in a case where the device is a display device for an automobile according to an embodiment of the present invention.
Figure 2:
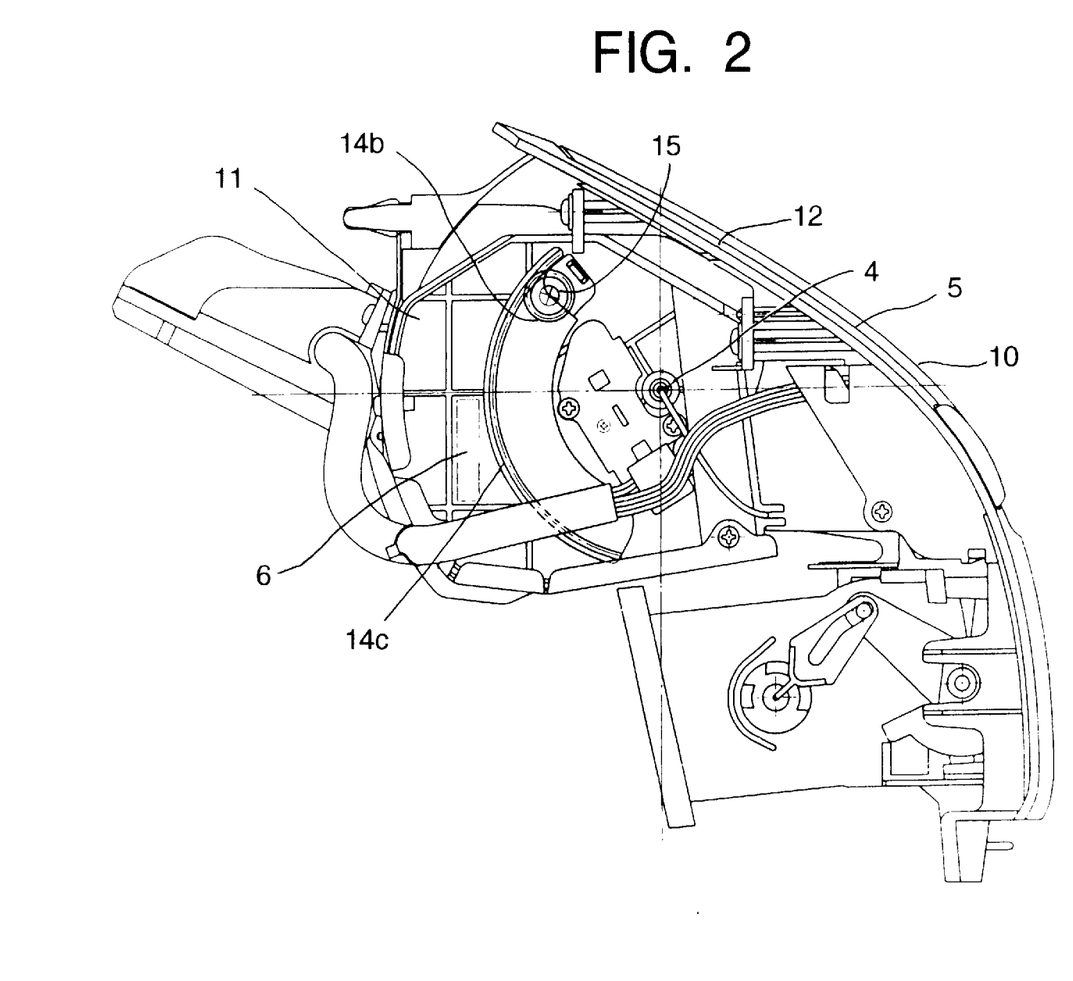
FIG. 2 is a side elevational view, as viewed from a bearing portion side, of the opening and closing type interior device in a case where the device is a display device for an automobile according to the embodiment of the present invention.
Figure 3:
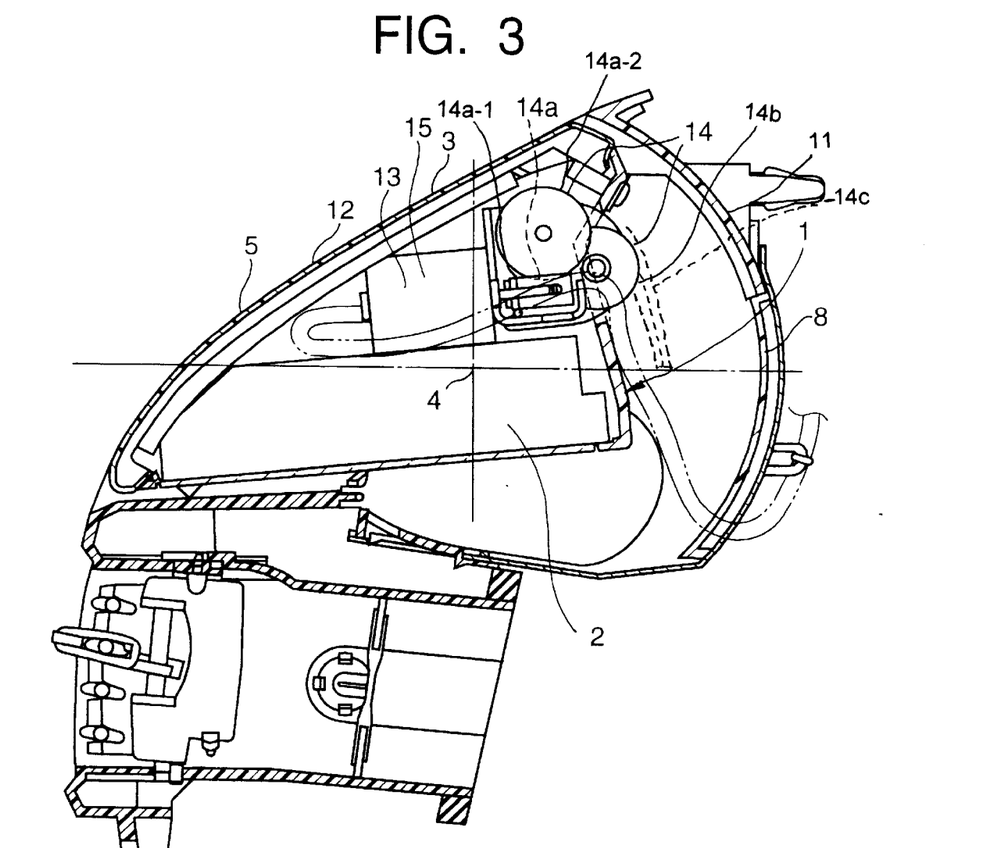
FIG. 3 is a cross-sectional view of an actuator portion of the opening and closing type interior device in a case where the device is a display device for an automobile according to the embodiment of the present invention.
Figure 4:
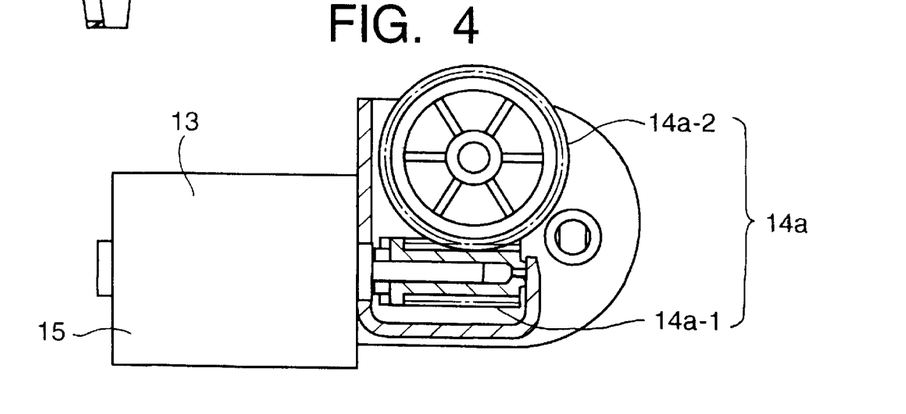
FIG. 4 is a front elevational view of an actuator of the opening and closing type interior device in a case where the device is a display device for an automobile and the actuator is a geared motor according to the embodiment of the present invention.
Figure 5:
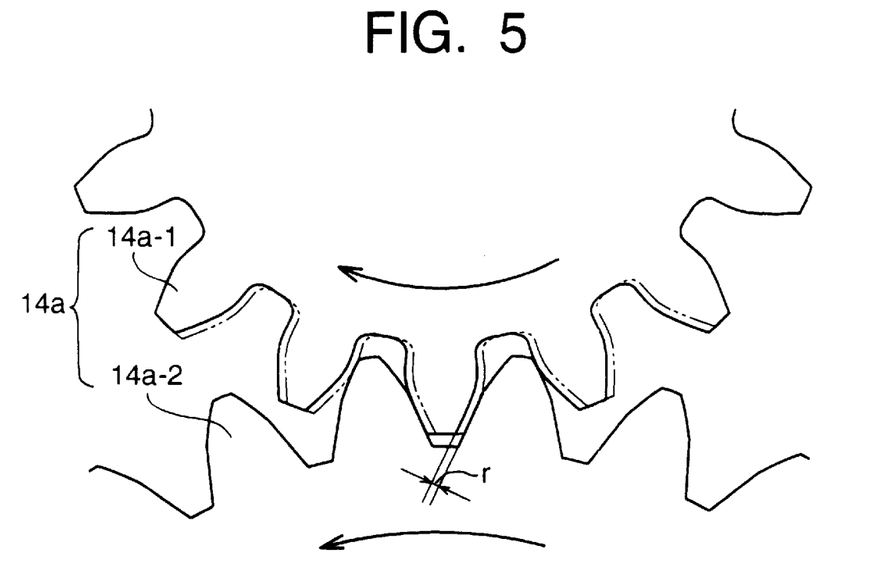
FIG. 5 is a front elevational view of an engaging portion of gears of the opening and closing type interior device in a case where the device is a display device for an automobile and the actuator is a geared motor.

A backlash, which is a clearance defined between a driving side gear and a driven side gear, is provided between each gear of the gear mechanism 14, for example, in the gear set 14a, or between the gear 14b and the gear 14c. FIG. 5 illustrates a backlash r of the gear 14a. The backlash r is provided between a worm as a driving side gear 14a-1 and a driven side gear 14a-2 in the case where the actuator 15 is the geared motor. Similarly, the backlash is provided between the gear 14b and the gear 14c.

Figure 7:
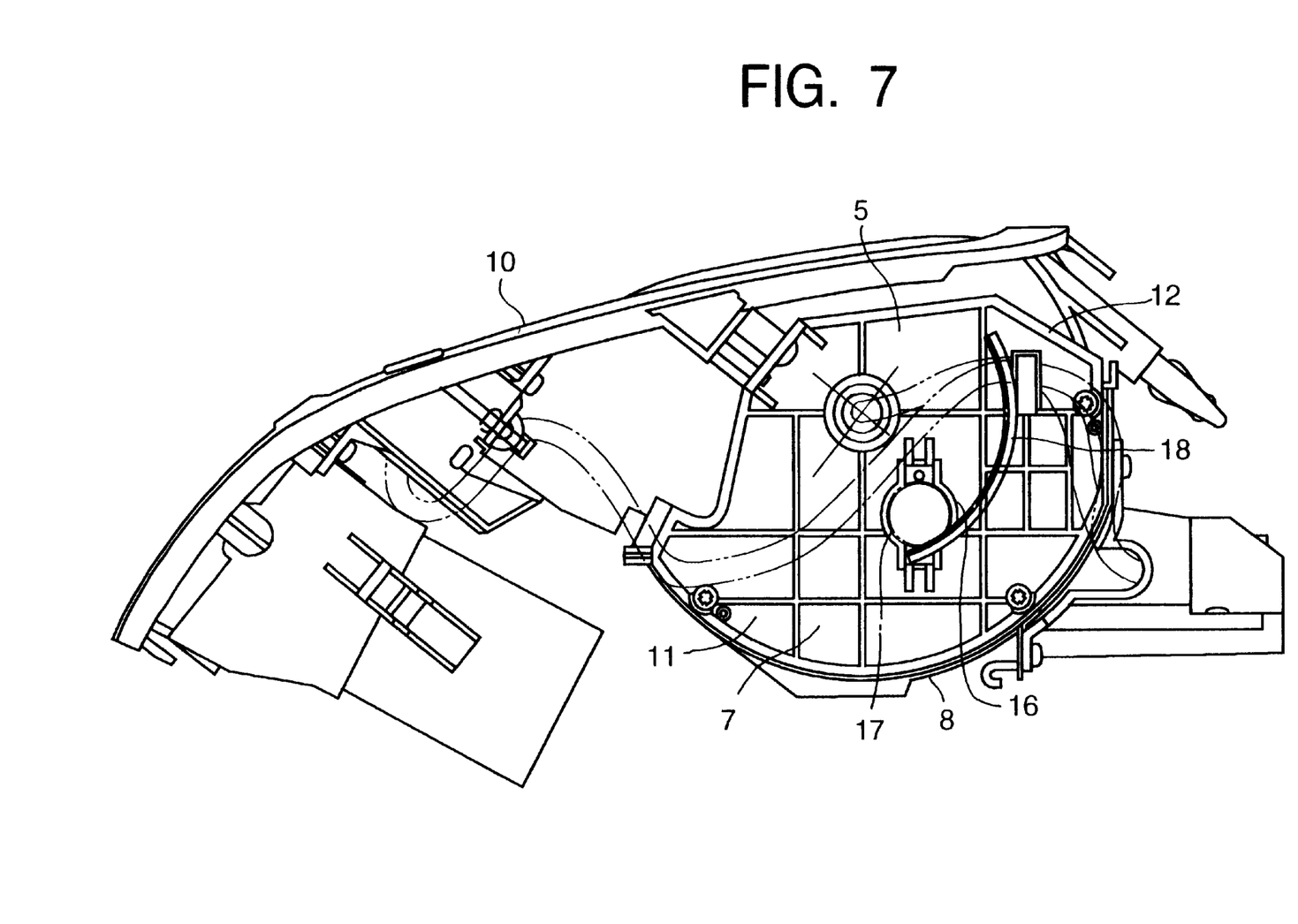
FIG. 7 is a side elevational view, as viewed at a damper portion, of the opening and closing type interior device in a case where the device is a display device for an automobile according to the embodiment of the present invention.

As shown in FIG. 7, the damper 16 is coupled to one of the movable member 12 and the fixed member 11, An internal gear 18 is coupled to the other of the movable member 12 and the fixed member 11, and extends in an arc. The damper 16 includes a shaft to which a gear 17 is coupled, and the gear 17 engages the arcuate internal gear 18.

In FIG. 7, which shows the case where the device 10 is the display device for an automobile, the damper 16 is coupled to the fixed member 11 and the internal gear 18 is coupled to the movable member 12. Alternatively, the damper 16 may be fixed to the movable member 12 and the arcuate internal gear 18 may be fixed to the fixed member 11.

In FIG. 7, which shows the case where the device 10 is the display device for an automobile, although the damper 16 is fixed to the side member 7 and the internal gear 18 is fixed to the casing 1, the damper 16 may be fixed to the side member 6.

The damper 16 may be any kind of damper so long as the damper causes resistance to rotation of the movable assembly 5. Preferably, the damper 16 is a hydraulic damper using fluid, for example oil, or a frictional damper.

Figures 8, 9, 10, 11:
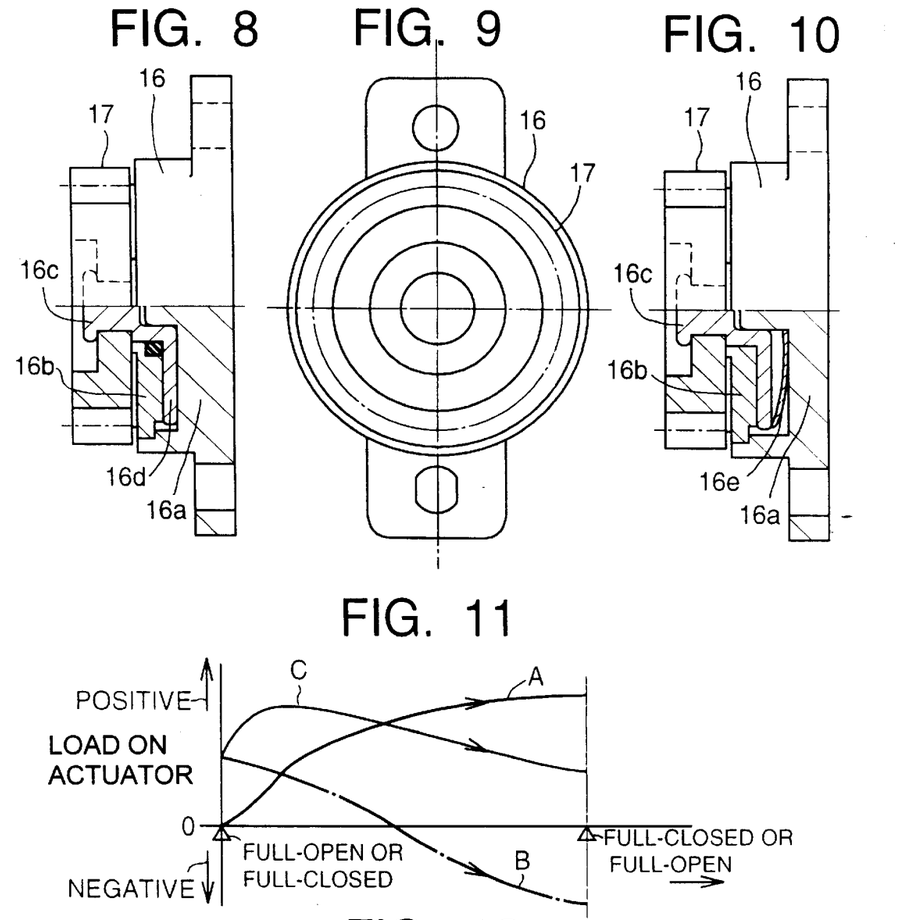
FIG. 8 is a side elevational view of a hydraulic damper of the opening an closing type interior device according to one embodiment of the present invention.
FIG. 9 is a front elevational view of a hydraulic damper of the opening and closing type interior device according to one embodiment of the present invention.
FIG. 10 is a side elevational view of a frictional damper of the opening and closing type interior device according to another embodiment of the present invention.
FIG. 11 is a graph illustrating a relationship between the load imposed on the actuator and an opening and closing position of the movable member of the opening and closing interior device in a case where, the damper is the hydraulic damper according to the first embodiment of the present invention.
Figure 12:
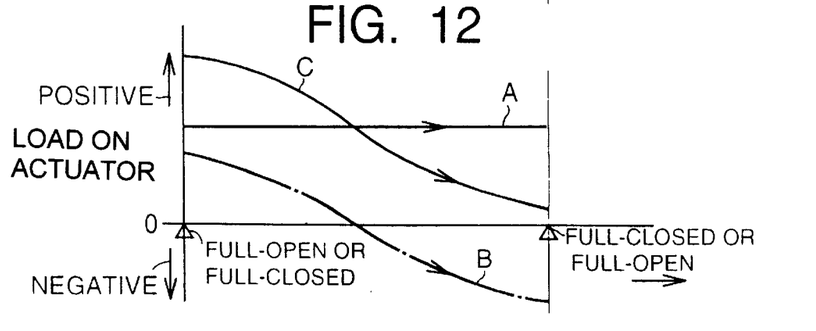
FIG. 12 is a graph illustrating a relationship between the load imposed on the actuator and an opening and closing position of the movable member of the opening and closing type interior device in a case where the damper is the frictional damper according to the other embodiment of the present invention.

FIG. 11 illustrates the load characteristics in a case where the damper 16 is a hydraulic damper. FIG. 12 illustrates the load characteristics in a case where the damper is a frictional damper.

The magnitude of the damper load is determined so that the summation (curve C of FIGS. 11 and 12) of the load (curve B of FIGS. 11 and 12) caused by a moment about the rotational axis 4 due to the weight of the movable assembly 5 acting on the center of gravity 9 of the movable assembly 5 and the load (curve A of FIGS. 11 and 12) caused by the damper 16 may not be reversed between a positive load and a negative load during rotation between the fully-opened position and the fully-closed position of the movable member 12.

In the case where the damper 16 is a hydraulic damper using fluid, the speed is slow and the damper load is small at the beginning of the movement. The damper load becomes greater as the speed is accelerated. The magnitude of the damper load can be easily set to a desired value by optionally selecting the viscosity of oil, the number of fins of the damper 16, the magnitude of a clearance between the fin and the casing, and the like. In the case where the damper 16 is a frictional damper, the damper load does not vary, and constant.

FIGS. 8 and 9 illustrate a structure of the damper 16 in a case where the damper 16 is a hydraulic damper of a viscous damping type. The damper 16 includes a casing 16a, a cap 16b fixed to the casing 16a, and a rotational shaft 16c. A portion 16d of the rotational shaft 16c has a fin-shaped configuration and is disposed in a space defined between the casing 16a and the cap 16b and filled with oil. When the rotational shaft 16c is rotated, the load generated causes the damping effect. The gear 17 is coupled to an outer end of the rotational shaft 16c.

FIG. 10 illustrates a structure of the damper 16 in a case where the damper is a frictional damper. The damper 16 includes a casing 16a, a friction plate cap 16b fixed to the casing 16a, a rotational shaft 16c, and a spring washer 16e. A portion 16d of the rotational shaft 16c has a disk configuration. The portion 16d is disposed between the casing 16a and the cap 16b and is pushed to the friction plate cap 16b by the spring washer 16e. When the rotational shaft 16c is rotated, the load generated causes the damping effect. The gear 17 is coupled to an outer end of the rotational shaft 16.

Next, operation according to the embodiments of the present invention will be explained.

With the aforementioned structure, the gear 14b is rotated in normal and reverse directions by driving the actuator 15 normally and reversely, so that the movable assembly 5 is rotated to be opened and closed about the rotational axis 4, as shown in FIG. 6.

The center of gravity 9 of the movable assembly 5 crosses the vertical line passing through the rotational axis 4 of the movable member 12 during the opening and closing motion of the movable member 12. In FIG. 6, the center of gravity 9 of the movable assembly 5 crosses above the rotational axis 4.

A conventional device in which a damper is not provided has the following problem, which will be explained with reference to FIG. 6. The load imposed on the actuator 15 changes according to an opening and closing angle of the movable member 12, and the load changes according to a positional relationship between the center of gravity 9 of the movable assembly 5 and the rotational axis 4, as shown in FIG. 6. When the actuator 15 is driven in a direction to open the movable member 12, a positive load (moment) is at first imposed on the actuator 15 to drive the movable assembly 5. After the center of gravity 9 of the movable assembly 5 crosses above the rotational axis 4, a moment opening the movable assembly 5 by itself is generated, so that a negative load (moment) is imposed on the actuator 15. At that time, the engagement of a driving side gear with a driven side gear is reversed. As a result, the actuator 15 is rotated reversely by the amount of the backlash causing hammering, which generates noise.

In contrast, in the present invention in which the damper 16 is provided, as illustrated in FIGS. 11 and 12, when the movable assembly 5 is opened and closed by the actuator 15, the load (curve A of FIGS. 11 and 12) is imposed on the actuator 15 by the damper 16. The load imposed on the actuator by the moment caused about the rotational axis due to the weight of the movable assembly 5 acting on the center of gravity 9 of the movable assembly 5 (curve B of FIGS. 11 and 12) changes as the center of gravity 9 is moved according to the opening and closing position of the movable assembly 5 and is reversed between positive and negative when the center of gravity 9 of the movable assembly 5 crosses the vertical line passing through the rotational axis 4. The total value of the load imposed on the actuator 15 (curve C which is a summation of curve A and curve B of FIGS. 11 and 12) is not reversed between positive and negative in the entire rotational range between the fully-opened position and the fully-closed position.

Accordingly, the noise generated by the backlash of gears 14a, 14b and 14c when the load is reversed between positive and negative can be effectively eliminated, or, at least suppressed, during either opening or closing.

In the case where the damper 16 is a hydraulic damper, the damper load changes according to the opening and closing speed of the movable assembly 5. At the beginning of the movement, the speed is slow, and the damper load is small. As the opening and closing motion progresses and the speed of the movable assembly 5 accelerates, the load of the damper 16 becomes large. Therefore, the total value of the load imposed on the actuator 15 is not reversed between positive and negative, and the load fluctuates less. Further, since the damper load is small at the beginning of the movement, a torque of the actuator 15, especially, a starting torque is only slightly reduced, so that an intensity of the torque of the actuator 15 is not necessary as compared with the conventional actuator.

According to the present invention, the following technical advantages are obtained.

First, since the opening and closing type interior device is provided with the damper, when the movable assembly including the movable member is driven between opened and closed, the damper applies a load to the movable assembly in a direction suppressing the opening and closing motion to thereby prevent the load imposed on the actuator from being reversed between a positive load and a negative load when the center of gravity of the movable assembly crosses the vertical line passing through the rotational axis of the movable member. As a result, the engagement of the driving side gear with the driven side gear of the actuator is prevented from being reversed, so that noise due to the backlash of the gear can be suppressed.

Second, in the case where the damper is a hydraulic damper using fluid, the damper load generated is small at the beginning of the movement, so that the starting torque of the actuator is only reduced slightly. Therefore, increasing the torque of the actuator is not necessary.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the presnet invention as defined by the following claims.

What is claimed is:

1. An opening and closing type interior device comprising:
   a fixed member;
   a movable member capable of being opened and closed, said movable member being movable relative to said fixed member;
   an actuator for driving said movable member to be opened and closed, said actuator including a driving source for driving said movable member and at least one gear mechanism for transmitting a driving force from said driving source to said movable member; and
   a damper coupled to one of said movable member and said fixed member,
   wherein said movable member includes a rotational axis, said movable member being rotatable about said rotational axis relative to said fixed member to a fully-opened and fully-closed position,
   said movable member and any member rotatable together with said movable member constituting a movable assembly having a center of gravity,
   said center of gravity of said movable assembly being located to one side of a vertical line passing through said rotational axis when said movable member is located at said fully-opened position and being located to the other side of the vertical line passing through said rotational axis when said movable member is located at said fully-closed position, said center of gravity crossing the vertical line passing through said rotational axis when said movable member is opened and closed,
   wherein said device is a display device for an automobile.

2. An opening and closing type interior device according to claim 1, wherein a magnitude of a load generated by said damper is determined so that a summation of a load imposed on said actuator by a moment caused about said rotational axis due to a weight of said movable assembly acting on said center of gravity of said movable assembly and a damper load, imposed on said actuator by said damper may not be reversed between positive and negative while said movable member is rotated between said fully-opened position and said fully-closed position.

3. An opening and closing type interior device according to claim 1, wherein said damper is a hydraulic damper.

4. An opening and closing type interior device according to claim 1, wherein said damper is a frictional damper.

5. An opening and closing type interior device according to claim 1, wherein said damper includes a casing and a cap having a space defined between said casing and said cap filled with oil, a fin portion inserted into the space filled with oil, and a rotational shaft connected to said fin portion and protruding from said casing and said cap.

6. An opening and closing type interior device according to claim 1, further comprising a internal arcuate gear extending in an arc, wherein said damper includes a rotational shaft and a gear fixed to said rotational shaft, said gear of said damper engaging said arcuate gear, one of said damper and said arcuate gear being fixed to said movable member and the other of said damper and said arcuate gear being fixed to said fixed member.

7. An opening and closing type interior device according to claim 1, wherein said actuator is supported by one of said movable member and said fixed member and includes a geared motor having a driving side gear and a driven side gear, said actuator having an output shaft to which a gear is fixed, an internal arcuate gear engaging said gear of said output shaft, said at least one gear mechanism including a first gear mechanism of said driving side gear and said driven side gear of said geared motor and a second gear mechanism of said gear of said output shaft and said internal arcuate gear, wherein said arcuate gear is fixed to the other of said movable member and said fixed member.

8. A device comprising:
   a fixed member;
   a movable assembly pivotally connected to said fixed member and configured to allow pivotal movement relative to said fixed member between a closed position and an open position, said closed and open positions defining a range of movement of said movable assembly therebetween;
   an actuator operatively coupled between said fixed member and said movable assembly to selectively apply a driving force on said movable member to affect pivotal movement thereof between said closed and open positions;
   a damper operatively coupled between said fixed member and said movable assembly;
   wherein for a first portion of said range of movement, the driving force is applied to said movable assembly so as to oppose a weight of said movable assembly and affect pivotal movement thereof;
   wherein for a second portion of said range of movement the driving force is applied to said movable assembly so as to oppose a damping force of said damper and affect pivotal movement of said movable assembly.

9. A device according to claim 8, wherein said movable assembly includes a display device;
   said display device being configured and positioned relative to said movable assembly such that in said closed position said display device faces generally downwardly relative to said fixed member and in said open position said display device faces generally outwardly relative to said fixed member.

10. A device according to claim 9, wherein said device is disposed in an automobile.

* * * * *

UNITED STATES PATENT AND TRADEMARK OFFICE
CERTIFICATE OF CORRECTION

PATENT NO. : 6,295,883 B1
DATED : October 2, 2001
INVENTOR(S) : Tsukada et al.

It is certified that error appears in the above-identified patent and that said Letters Patent is hereby corrected as shown below:

<u>Title page,</u>
Please change, item [(73)Assignee: Kejima Press Industry Co., Ltd., Toyota (JP)] to -- [73], Assignee, Kojima Press Industry Co., Ltd., Toyota (JP) --

Signed and Sealed this

Ninth Day of April, 2002

Attest:

JAMES E. ROGAN
*Attesting Officer*     *Director of the United States Patent and Trademark Office*